United States Patent Office 3,393,189
Patented July 16, 1968

3,393,189
PROCESS FOR POLYMERIZING BUTADIENE AND ISOPRENE USING SUBSTITUTED PHENYLLITHIUM CATALYSTS
William J. Trepka and Richard J. Sonnenfeld, Bartlesville, Okla., assignors to Phillips Petroleum Company, a corporation of Delaware
No Drawing. Filed Mar. 22, 1967, Ser. No. 625,012
8 Claims. (Cl. 260—94.2)

ABSTRACT OF THE DISCLOSURE

Polymerizing isoprene and butadiene using a catalyst selected from

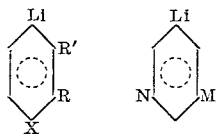

wherein X is selected from chlorine, bromine, and fluorine, and R is selected from alkyl, hydrogen, chlorine, bromine, and fluorine, R' is selected from alkyl and hydrogen, at least one of R and R' being a non-hydrogen substituent, and wherein N and M are selected from chlorine, bromine, fluorine, and alkyl, at least one of N and M being selected from fluorine, bromine, and chlorine.

---

This invention relates to a process for polymerizing butadiene and isoprene.

In another aspect, the invention relates to a process for polymerizing butadiene, isoprene, and mixtures thereof by contacting same with certain disubstituted phenyllithium compounds used as polymerization initiators.

In another aspect, the invention relates to a process for initiating the polymerization of isoprene, butadiene, and mixtures thereof by contacting same with certain monosubstituted 4-halophenyllithium compounds at low concentration levels of these compounds. In a specific aspect, the invention relates to the polymerization of isoprene, butadiene, and mixtures thereof in the presence of initiators having the general formulas:

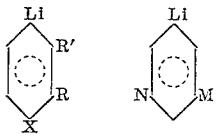

wherein X is selected from chlorine, bromine, and fluorine, and R is selected from alkyl, hydrogen, chlorine, bromine, and fluorine, R' is selected from alkyl and hydrogen, at least one of R and R' being a non-hydrogen substituent, and wherein N and M are selected from chlorine, bromine, fluorine, and alkyl, at least one of N and M being selected from fluorine, bromine, and chlorine.

Those skilled in the art have long been seeking polymerization initiators for isoprene and butadiene polymerization at high conversion rates to obtain polymers having relatively high cis content, and good processability.

It is an object of this invention to provide initiators for the polymerization of butadiene and isoprene which effect high conversion rates.

Another object is to provide a process for producing rubbery polymeric products having relatively high cis content and improved processability.

Still another object of the invention is to provide a method for controlling the physical properties, particularly the inherent viscosity and the cis-1,4-addition content of polymers made from butadiene, isoprene and mixtures thereof.

A further object of the invention is to provide initiators for the polymerization of butadiene and isoprene which are effective to form polymers having a relatively high percentage of cis-1,4-addition and improved processability while permitting polymerization at low initiator concentration levels.

Other aspects, objects, and the advantages of this invention will be apparent upon reading the accompanying disclosure and claims.

Broadly, the invention provides a process for the polymerization of conjugated diene monomers, particularly butadiene, isoprene, and mixtures thereof, by contacting same with at least one of certain di-substituted phenyllithium catalysts.

Specifically, the catalysts of this invention are selected from

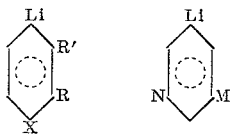

wherein X is selected from chlorine, bromine, and fluorine, R is selected from alkyl, hydrogen, chlorine, bromine, and fluorine, and R' is selected from alkyl and hydrogen, at least one of R and R' being a non-hydrogen substituent, and wherein N and M are selected from chlorine and bromine, fluorine and alkyl, at least one of N and M being selected from fluorine, bromine, and chlorine. Generally, when N, M, R, or R' are alkyl, the substituents will contain from 1 to 8 carbon atoms.

As the data in the examples show, the initiators used in the process of this invention are particularly effective in producing polymers having a relatively high percentage of cis-1,4-addition and low inherent viscosity at relatively low initiator concentration levels.

The phenyllithium initiators of this invention can be used separately, or in any combination of two or more. Separate species of the phenyllithium initiators or any combination thereof can also be employed in combination with any organolithium initiator or combinations thereof known to the art so long as the polymerization reaction is not deleteriously affected.

The initiators of this invention can be prepared by any method desired. One suitable procedure is to react a polyhalophenyl compound such as 4-bromo-1,2-dichlorobenzene or 2,5-dibromotoluene with a sufficient amount of an alkyllithium compound such as sec- or n-butyllithium so that an amount up to and including 1 mole of lithium is provided for each mole of polyhalophenyl compound. Preferably, the initiator is prepared in the absence of deleterious substances. Such substances can be excluded by employing only purified materials and by preparing the catalyst under a blanket of inert gas such as argon, helium, nitrogen, and the like.

Examples of initiators useable in the process of this invention are:

3,4-dichlorophenyllithium
4-bromo-3-methylphenyllithium
4-bromo-2-methylphenyllithium
3,4-dibromophenyllithium
3-chloro-4-fluorophenyllithium
4-bromo-3-fluorophenyllithium
4-chloro-3-octylphenyllithium
4-bromo-2,3-dimethylphenyllithium
2-methyl-3,4-dibromophenyllithium
2-ethyl-4-fluorophenyllithium
3,5-dichlorophenyllithium
3,5-dibromophenyllithium
3,5-difluorophenyllithium
3-chloro-5-fluorophenyllithium 3-bromo-5-chlorophenyllithium
3-bromo-5-methylphenyllithium
3-chloro-5-octylphenyllithium
3-fluoro-5-propylphenyllithium
4-bromo-3-octylphenyllithium
4-chloro-2-octylphenyllithium
4-chloro-2,3-dihexylphenyllithium The general method of initiator preparation employed in the examples below is as follows. Recipe components, namely, an organolithium compound, a di- or trihalo compound, and a diluent such as toluene, are charged to an oven-dried, nitrogen-gas purged reactor. The reactor is purged at 25 p.s.i. with nitrogen and tumbled at 122° F. The initiators formed as products are employed for polymerization as either washed or unwashed materials. The term "unwashed" refers to utilization of a total preparation from the reactor, and the term "washed" refers to use after centrifugation of the preparation, decanting of the liquid, washing with cyclohexane, centrifugation, decanting the cyclohexane wash, and suspending in cyclohexane. Initiator yield is determined in terms of total alkalinity by acid titration of hydrolized aliquots.

The organolithium polymerization initiator can be prepared in a hydrocarbon or polar medium. Hydrocarbons of the same type used for the polymerization are applicable as well as materials which boil at a temperature above 200° C. When a polar solvent is used for the initiator preparation, it is desirable that it be replaced with a hydrocarbon diluent prior to addition of the initiator to the polymerizable monomer. The relatively high boiling or heavy hydrocarbon dispersing medium is advantageous in that it serves to coat the organolithium particles and keeps them in a highly dispersed form as well as rendering them non-pyrophoric and consequently easy to handle. Examples of hydrocarbon diluents are benzene, toluene, cyclohexane, methylcyclohexane, xylene, n-butane, n-hexane, n-pentane, n-heptane, isooctane, mixtures thereof, and the like.

Examples to polar solvents are tetrahydrofuran and diethyl ether.

To effect polymerization of conjugated dienes such as butadiene, isoprene, and mixtures thereof, the monomer or monomers is contacted with one or more of the initiators of the invention. The temperature employed for polymerization is generally within the range of −100° C. (−148° F.) to 150° C. (302° F.), preferably from −75° C. (−103° F.) to +100° C. (212° F.). The particular temperature employed depends upon both the monomer and the initiators used in the polymerization. The pressure employed during polymerization should be sufficient to maintain the reaction mixture substantially completely in the liquid phase. Preferably, the polymerization is effected in the presence of an inert gas atmosphere such as argon, helium, nitrogen, and the like.

The polymerization is preferably carried out in the presence of a suitable diluent, such as benzene, toluene, cyclohexane, methylcyclohexane, xylene, n-butane, n-hexane, n-pentane, n-heptane, isooctane, mixtures thereof, and the like. Generally, the diluent is selected from hydrocarbons such as the paraffins, cycloparaffins, and aromatics containing from 4 to 10, inclusive, carbon atoms per molecule.

In practice, the polymerization reaction can be effected as follows. (This method was used to obtain the data reproduced in the examples below.) Polymerization runs are effected by charging 40 grams of monomer to a reactor after washing the reactor with cyclohexane, purging the reactor for five minutes with three liters per minute of nitrogen, and charging same with cyclohexane diluent. The monomer is added to the reactor by means of a closed dispenser at 25 p.s.i. nitrogen pressure, the initiator is charged by means of a syringe, and the reactor is tumbled at 158° F. Upon completion of reaction the polymer is coagulated with isopropanol and stabilized with one percent 2,2′-methylene-bis-(4-methyl-6-butylphenol). The polymers produced are gel free.

The products resulting from the polymerization of butadiene or isoprene are obtained as solutions which can be treated with various reagents to produce functional groups by replacing the terminal lithium atoms on the polymer molecules. For example, polymer in solution can be contacted first with carbon dioxide and then with an acid to replace the lithium atoms with —COOH groups. Other functional groups which can be introduced include —SH, —OH, and the like. Alternatively, the unquenched polymer solutions can be treated with an alcohol or other reagent to inactivate the initiator and/or precipitate polymer which is then recovered without functional groups.

The rubbery polymers of isoprene or butadiene produced in accordance with this invention can be compounded by any of the known methods for compounding rubbers. Vulcanizing agent, vulcanization accelerators, accelerator activators, reinforcing agent, antioxidants, softeners, plasticizers, fillers and other compounding ingredients normally employed in rubbers can likewise be used in the polymers of this invention. The rubbery diene polymers have utility in applications where both natural and synthetic rubbers are used. In addition, the rubbery polymers produced by the method of this invention can be blended by any suitable method with other synthetic rubbers and/or natural rubber. For example, they can be used in the manufacture of automobile tires, gaskets, and other rubbery articles.

The quantity of initiator employed during the polymerization can vary appreciably depending on the initiator selected, the polymerization conditions, and the nature and purity of the monomers. The amount is generally expressed in terms of milliequivalents of lithium per 100 grams of monomer. In general, the quantity employed is that which contains from 0.1 to 40 milliequivalents of lithium per 100 grams of monomer, but, preferably, initiator concentration level will be no greater than 5 milliequivalents of lithium per 100 grams of monomer. As disclosed above, the initiators of this invention are effective in producing high monomer conversion levels, and in producing polymers having a relatively high percentage of cis-1,4-addition and improved processability, even when initiator concentration level is no greater than 5 milliequivalents of lithium per 100 grams of monomer.

The following examples demonstrate the effectiveness of the initiators of this invention, particularly at low concentration levels.

Example I

A methyl substituted 4-bromophenyllithium initiator (namely, a mixture of

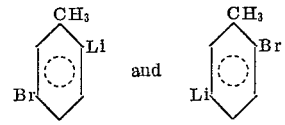

known as 4-bromo-2-methylphenyllithium and 4-bromo-3-methylphenyllithium) was prepared as presented in the following recipe:

TABLE 1

| | |
|---|---|
| 2,5-dibromotoluene | mmols__ 20 |
| Toluene | mols__ 0.94 |
| Sec-butyllithium | mmols__ 20 |
| Time | hours__ 3 |
| Temperature | ° F__ 122 |

Two runs were made by the general method. Results are summarized below:

| | Treatment | Normality |
|---|---|---|
| Run A | Washed | 0.17 |
| Run B | Unwashed | 0.16 |

The initiator compositions prepared above were employed to initiate isoprene polymerization by the method described above as is presented by the following recipe:

TABLE 2

| | | |
|---|---|---|
| Isoprene | parts by weight | 100 |
| Cyclohexane | do | 1000 |
| Initiator | do | Variable |
| Temperature | °F | 158 |
| Time | hours | 2 |

Polymers were produced, and characterized as to microstructure by conventional tests. The results appear in Table 3.

TABLE 3

| Run No. | Source of Initiator | Concentration in mhm.[a] | Conversion, Percent | Microstructure,[1] Percent | | Inherent Viscosity |
|---|---|---|---|---|---|---|
| | | | | Cis | 3,4- | |
| 1 | Run A (washed) | 1.25 | 0 | | | |
| 2 | A | 1.5 | 97 | 90 | 6.3 | 10.62 |
| 3 | A | 2.0 | 100 | 86 | 6.8 | 8.04 |
| 4 | A | 5.0 | 100 | 78 | 7.8 | 4.25 |
| 5 | Run B (unwashed) | 1.25 | 0 | | | |
| 6 | B | 1.5 | 57 | | | |
| 7 | B | 2.0 | 87 | 92 | 5.5 | 6.60 |
| 8 | B | 3.0 | 91 | 92 | 5.3 | 5.42 |
| 9 | B | 5.0 | 95 | 87 | 5.7 | 3.38 |

See footnotes following Table 9.

These data demonstrate that the above initiator, an example of the initiators of this invention, produces, at a relatively low initiator level, polymers with a high cis content that are comparatively easy to process. Method of determination is described following Example V.

Example II

A chloro substituted 4-chlorophenyllithium initiator (3,4-dichlorophenyllithium) was prepared by reacting 4-bromo-1,2-dichlorobenzene and sec-butyl lithium by the general method and according to a recipe analogous to that of Example I. Two runs were made. Results are summarized below:

| | Treatment | Normality |
|---|---|---|
| Run C | Washed | 0.13 |
| Run D | Unwashed | 0.12 |

These initiator compositions were employed to initiate isoprene polymerization by the general method as presented by the recipe of Table 2. Polymers were produced, and characterized as to microstructure. (See Table 4.)

TABLE 4

| Run No. | Source of Initiator | Concentration in mhm. | Conversion, Percent | Microstructure, Percent | | Inherent Viscosity |
|---|---|---|---|---|---|---|
| | | | | Cis | 3,4- | |
| 10 | Run C (washed) | 1.5 | 100 | 94 | 7.4 | 8.11 |
| 11 | C | 2.0 | 100 | 81 | 7.5 | 6.44 |
| 12 | C | 3.0 | 100 | 81 | 7.3 | 5.47 |
| 13 | C | 5.0 | 100 | 77 | 8.4 | 3.97 |
| 14 | Run D (unwashed) | 1.0 | 96 | 92 | 6.3 | 5.57 |
| 15 | D | 1.25 | 96 | 87 | 6.5 | 4.82 |
| 16 | D | 1.5 | 100 | 84 | 7.0 | 3.80 |
| 17 | D | 2.0 | 99 | 84 | 6.9 | 3.01 |
| 18 | D | 3.0 | 97 | 77 | 7.2 | 2.16 |
| 19 | D | 5.0 | 98 | 69 | 8.5 | 1.34 |

These data further demonstrate that the initiators of this invention produce, at a relatively low initiator level, polymers that have a high cis content and are comparatively easy to process.

Example III 4-bromophenyllithium, an initiator of prior art disclosure, was prepared by reacting 1,4-dibromobenzene and sec-butyl lithium by the general method and according to a recipe analogous to that Example I except that in Run F of this example, 0.92 mol of cyclohexane rather than 0.94 mol of toluene were employed. Two runs were made. Results are summarized below:

| | Treatment | Normality |
|---|---|---|
| Run E | Unwashed | 0.16 |
| Run F | do | 0.16 |

The initiator compositions prepared thus were employed to initiate isoprene polymerization by the recipe of Table 2. Data are presented in the following table:

TABLE 5

| Run No. | Source of Initiator | Concentration in mhm. | Conversion, percent |
|---|---|---|---|
| 20 | Run E (unwashed) | 3.0 | 0 |
| 21 | E | 5.0 | 26 |
| 22 | Run F (unwashed) | 3.0 | 0 |
| 23 | F | 5.0 | 0 |

This example demonstrates then that the 4-halophenyllithium initiators of the prior art are relatively ineffective in comparison to the initiators of this invention at comparable initiator concentration levels.

Example IV

As a control, an initiator composition outside the scope of this invention was prepared by reacting 2,5-dibromo-p-xylene and n-butyl lithium,

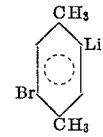

known as 2-lithium-5-bromo-p-xylene, by the general method and according to a recipe analogous to that of Example I. Two runs were made. Results are summarized below:

| | Treatment |
|---|---|
| Run G | Washed |
| Run H | Unwashed |

The initiator compositions prepared thus were employed to initiate isoprene polymerization by the recipe of Table 2. Data are presented in the following table:

TABLE 6

| Run No. | Source of Initiator | Concentration in mhm. | Conversion, percent |
|---|---|---|---|
| 24 | Run G (washed) | 3.0 | 0 |
| 25 | do | 5.0 | Trace |
| 26 | Run H (unwashed) | 10.0 | 0 |

This example demonstrates that substituted 4-halophenyllithium initiators outside the scope of this invention are relatively ineffective in comparison to the initiators of this invention at comparable initiator levels.

Example V

Example V demonstrates that the polymers produced by the process of this invention have superior processing properties, and that the cured elastomers have very desirable physical properties. In particular, the cured elastomers exhibit very good tensile strengths.

Polymers as exemplified by the first three examples of this disclosure were compounded, cured, and then tested for physical properties. The following compounding recipe was employed.

TABLE 7.—COMPOUNDING RECIPE

| | Parts by weight |
|---|---|
| Polymer | 100 |
| IRB #2 [1] | 50 |
| Zinc oxide | 3 |
| Stearic acid | 3 |
| Flexamine [2] | 1 |
| Flexzone 3C [3] | 2 |
| Philrich 5 [4] | 5 |
| Vultrol [5] | 1 |
| Sulfur | 2.25 |
| NOBS special [6] | 0.65 |

See footnotes following Table 9.

The following processing and physical properties were noted for the polymers.

TABLE 8.—PROCESSING PROPERTIES

| | Run 27[b] | Run 28[c] | Run 29[d] |
|---|---|---|---|
| Extrusions at 195° F. (Garvey die):[11] | | | |
| Inches/minute | 61 | 64 | 43 |
| Grams/minute | 97 | 82 | 66 |
| Rating (Garvey die) | 7+ | 8+ | 7− |

See footnotes following Table 9.

TABLE 9.—PHYSICAL PROPERTIES, 30 MINUTES CURE AT 293° F.

| | Run 30[b] | Run 31[c] | Run 32[d] |
|---|---|---|---|
| $\nu \times 10^4$, [7 d] moles/cc | 1.82 | 1.77 | 1.82 |
| 300% Modulus,[8] p.s.i | 1,585 | 1,380 | 1,425 |
| Tensile,[8] p.s.i | 4,200 | 3,160 | 3,320 |
| Elongation,[8] percent | 600 | 550 | 555 |
| Max. tensile 200° F., p.s.i | 2,240 | | |
| $\Delta T$,[9] ° F | 44.4 | 42.4 | 38.6 |
| Resilience,[10] percent | 70.0 | 72.8 | 75.2 |
| Shore A Hardness [11] | 61.5 | 63 | 62 |
| Compression Set, percent | 19.0 | 19.8 | 19.4 |

[1] Industry Reference Black No. 2 (a high abrasion furnace black).
[2] A physical mixture of a complex diarylamine-ketone reaction product (65%) and N,N'-diphenyl-p-phenylenediamine (35%).
[3] N-isopropyl - N' - phenyl-p-phenylenediamine (Naugatuck brand of antiozonant and antioxidant).
[4] Highly aromatic oil.
[5] N-nitrosodiphenylamine (scorch retarder).
[6] N-oxydiethylene-2-benzothiazyl sulfenamide.
[7] Swelling method of Kraus, Rubber World 135, 67–73, 254–280 (1956). This value is the number of effective network chains per unit volume of rubber. The higher the number, the more the rubber is crosslinked (vulcanized).
[8] ASTM D 412–151T. Scott Tensile Machine L–6. Tests made at 80° F.
[9] ASTM D 623–58. Method A. Goodrich Flexometer, 143 lbs./sq. in. load, 0.175 inch stroke. Test specimen is a right circular cylinder 0.7 inch in diameter and one inch high.
[10] ASTM D 945–55 (Modified). Yerzley Oscillograph. Test specimen in a right circular cylinder 0.7 inch in diameter and one inch high.
[11] ASTM D 676–55T. Shore durometer, Type A.
[a] Millimoles per 100 g. of monomer.
[b] Runs 27 and 30 of Tables 8 and 9 were effected with polyisoprene polymers that had been produced according to Example I with the initiator of Run B employed at 3.555 mhm in the recipe of Table 2.
[c] Runs 28 and 31 of Tables 8 and 9 were effected with polyisoprene polymers that had been produced according to Example II with the initiator of Run D employed at 1.1 mhm in the recipe of Table 2.
[d] Runs 29 and 32 were effected as were Runs 28 and 31, except that the initiator of Run C of Example II was employed at 1.1 mhm.
[f] Microstructures in above examples were determined using a conventional infrared spectrometer. The samples were dissolved in carbon disulfide to form a solution containing 25 grams of polymer per liter of solution. Calibrations were based on the deproteinized natural rubber as a reference material assuming that it contained 98% cis and 2 percent 3,4-addition product. The cis was measured at the 8.9 micron band and the 3,4-addition at the 11.25 micron band. In the presence of a high cis polyisoprene, trans content was not detectable, since trans is measured at the 8.75 micron band. Raw cis and raw 3,4-addition values are presented.
[11] Number 1/2 Royle Extruder with Garvey die, see Ind. Eng. Chem. 34, 1309 (1942). As regards the "rating," FIGURE 12 designates an extruded product considered perfectly formed, whereas lower figures indicate less perfect products.

Example VI

A 3,5-dihalophenyllithium initiator, namely, 3,5-dichlorophenyllithium, was prepared in a manner identical to the method of preparation of 3,4-dichlorophenyllithium in Example II. This initiator was employed as an "unwashed" material, and was 0.14 molar. Using the recipe shown in Table 2 (Example I), the 3,5-dichlorophenyllithium initiator was used to polymerize isoprene. Results are shown in Table 10 below.

TABLE 10

| Run No. | Source of Initiator | Concentration in mhm. | Conversion, percent | Microstructure, percent | | Inherent Viscosity |
|---|---|---|---|---|---|---|
| | | | | Cis | 3,4- | |
| 33 | Unwashed | 1.0 | 90 | 84 | 5.9 | 6.15 |
| 34 | do | 1.2 | 86 | 86 | 5.7 | 5.39 |
| 35 | do | 1.5 | 93 | 81 | 5.9 | 4.59 |
| 36 | do | 2.0 | 94 | 81 | 6.3 | 3.74 |

The data in Table 10 show that a 3,5-di-substituted phenyllithium initiator within the scope of this invention produces a polyisoprene polymer having high cis content and high conversion levels and is particularly effective at low initiator levels (namely, below 5 mhm.).

Reasonable modifications and variations are possible within the scope of the foregoing invention, the essence of which is a process for the polymerization of conjugated dienes by contacting same with certain di-substituted phenyllithium compounds.

We claim:

1. The process for polymerizing a monomer selected from butadiene, isoprene, and mixtures thereof, comprising contacting said monomer with at least one catalyst selected from

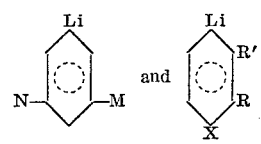

wherein X is halo, and R is selected from alkyl, hydrogen, chlorine, bromine, and fluorine, R' is selected from alkyl and hydrogen, at least one of R and R' being a non-hydrogen substituent, and wherein N and M are selected from chlorine, bromine, fluorine, and alkyl, at least one of N and M being selected from fluorine, bromine, and chlorine.

2. The process of claim 1 wherein the catalyst is selected from

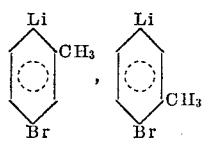

and mixtures thereof.

3. The process of claim 2 wherein the monomer is isoprene, and the catalyst concentration level is no greater than 5 millimoles per 100 grams of isoprene.

4. The process of claim 1 wherein the catalyst is

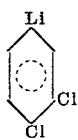

5. The process of claim 4 wherein the monomer is isoprene, and the catalyst concentration level is no greater than 5 millimoles per 100 grams of isoprene.

6. The process of claim 1 wherein the catalyst concentration level is no greater than 5 millimoles per 100 grams of monomer.

7. The process of claim 1 wherein the catalyst is

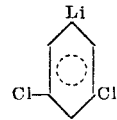

8. The process of claim 7 wherein the monomer is isoprene, and the catalyst concentration level is no greater than 5 millimoles per 100 grams of isoprene.

References Cited

UNITED STATES PATENTS 3,326,881   6/1967   Uraneck et al. _____ 260—82.1

JOSEPH L. SCHOFER, *Primary Examiner.*

J. C. HAIGHT, *Assistant Examiner.*